United States Patent [19]

Commes

[11] Patent Number: 4,953,428
[45] Date of Patent: Sep. 4, 1990

[54] TOOL FOR STRIPPING CABLES, IN PARTICULAR CONSTITUTED CABLES

[75] Inventor: Bernard Commes, Saint Médard d'Eyrans, France

[73] Assignee: Aerospatiale Societe Nationale Industrielle, Paris, France

[21] Appl. No.: 452,759

[22] Filed: Dec. 18, 1989

[30] Foreign Application Priority Data

Dec. 22, 1988 [FR] France .................. 88 16999

[51] Int. Cl.$^5$ ............................ H02G 1/12
[52] U.S. Cl. ........................ 81/9.4; 30/90.7
[58] Field of Search ............ 81/9.4, 9.44; 30/90.1, 30/90.4, 90.6, 90.7

[56] References Cited

U.S. PATENT DOCUMENTS 2,480,107  8/1949  Baldwin et al. ............ 30/90.1

FOREIGN PATENT DOCUMENTS 752585  7/1980  U.S.S.R. ........................ 81/9.4

Primary Examiner—Roscoe V. Parker
Attorney, Agent, or Firm—Martin Smolowitz

[57] ABSTRACT

The tool comprises a tubular element in which conductor or conductors are engaged so as to cause the tubular element to penetrate between the conductor or conductors and the outer sheath of the cable to be stripped. The tubular element (4) is detachably positioned at one end on a support member (1) of elongated shape, so as to extend parallel to and in the same direction as the support member while defining a gap (5) between the support member and the tubular element, the gap being closed at the opposite end of the support member (1) by a cutting device (12) mounted on said end in such manner as to be orientable between an axial cutting position and a radial cutting position.

13 Claims, 3 Drawing Sheets

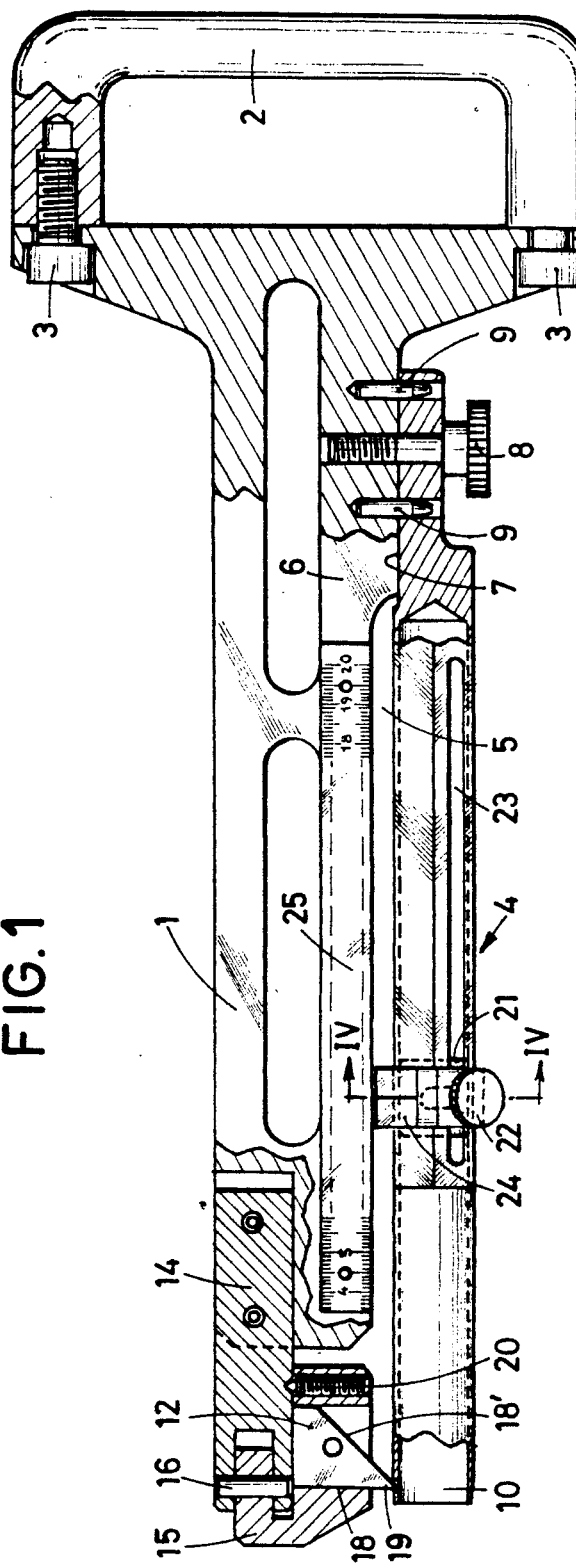
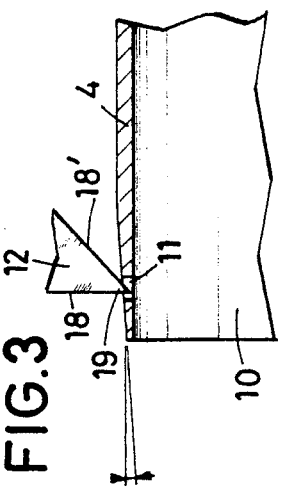
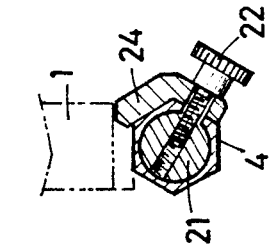
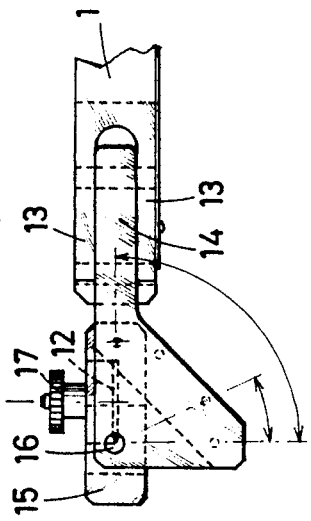

TOOL FOR STRIPPING CABLES, IN PARTICULAR CONSTITUTED CABLES

BACKGROUND OF THE INVENTION

The present invention relates to the stripping, i.e. the cutting and removal of an end section of an outer sheath of electric, optical or other cables, and relates more generally to stripping of any cylindrical body protected by a flexible, or relatively flexible sheath.

The invention was developed in particular, but not exclusively, for the stripping of electric cables termed "constituted" cables comprising a plurality of layers of independent insulated conductors, twisted together, the strands thus formed being themselves protected by an outer protective, insulating or conductive sheath, and for the stripping of such constituted cables having an extra sheath which may comprise one or more insulated and/or screened conductors.

Cables of these types are mainly employed in technical fields in which a very high precision is absolutely imperative and, in order to connect such cables, previously cut to the desired lengths, it is necessary to strip their ends in such manner that the outer sheath is cut sharply and cleanly, in a perfectly radial manner, i.e. exactly at 90° to their axis.

Many methods and apparatus are known for stripping the ends of electric cables, but none has an absolute reliability and/or none provides a sharp, clean and perfectly radial cutting quality.

Furthermore, the protection of the subjacent insulations, or sheaths, is not ensured in a mechanical or manual stripping apparatus when the thickness of the outer sheath is uneven—which is the case of many constituted cables—and the subjacent layers are then liable to be deteriorated either by an inadapted adjustment or by a defect in the manual dexterity of an operator.

FR-A-2,299,746 discloses a method and device for removing a section of given length of the screen (or the sheath) of a coaxial cable, in which the strands of conductors are inserted in a tubular cylindrical element, or punch, in such manner as to cause the element to pass under the screen, between the latter and the strands of the cable to be stripped, thereby creating an annular expansion of the screen in front of the end of the punch. The cable is passed through an opening of a die whose diameter is equal to the outside diameter of the screen, thereby resulting in a cutting of the latter around the cutting end of the punch. However, the cut obtained by means of this device is on a bevel owing to the fact that, in order to be able to cut the screen, the end of the punch must be chamfered. This device is therefore unsuitable for producing the desired sharp, radial cut.

FR-A-2,614,142 discloses another stripping device which is specially designed to strip a sheathed wire and comprises a tubular support in which the wire to be stripped is engaged and clamped, and a stripping assembly which is also tubular and includes cutting blades orthogonal to the axis of the wire and pivotally mounted so as to move toward or away from the conductor, and means for cutting the sheath axially. As most of the other known stripping devices, this device does not permit precisely controlling the depth of the cuts effected axially and radially, which, as far as this device is concerned, is only of relative importance, since there is no insulation around the conductor for which deterioration must be avoided.

This apparatus is also unsuitable for the purpose of the invention, which is to obtain a clean and sharp radial stripping with no risk of deteriorating the insulations of the subjacent conductors, while effecting a perfectly radial cut.

An object of the invention is to overcome these drawbacks of the known stripping devices for cables.

SUMMARY OF THE INVENTION

The invention therefore provides a cable stripping tool, of the type comprising a tubular element in which the conductor or conductors are engaged so as to cause said tubular element to penetrate between the conductor or conductors and the outer sheath of the cable to be cut, wherein said tubular element is positioned by one end on a member of a support of elongated shape, so as to extend parallel to the latter and in the same direction while leaving therebetween a gap which is closed at the opposite end of said support by cutting means mounted on said end to be pivotable between an axial cutting position and a radial cutting position.

According to another feature of the invention, said cutting means is engaged in an opening provided in the thickness of the end of said tubular element, without projecting into the interior of said element.

The following description, with reference to the accompanying drawings given by way of non-limitative examples, will explain how the invention can be carried out.

DESCRIPTION OF THE DRAWINGS

FIG. 1 is a side elevational view of a tool for stripping cables according to the invention.

FIG. 2 is a partial top plan view showing the mounting of the cutting blade at the end of the support.

FIG. 3 is a detail view to an enlarged scale of the engagement of the cutting blade in the wall of the tubular element.

FIG. 4 is a partial sectional view, taken on line IV—IV of FIG. 1, of the mounting of the adjustable stop on the tubular element.

DESCRIPTION OF PREFERRED EMBODIMENTS

Figure 5:
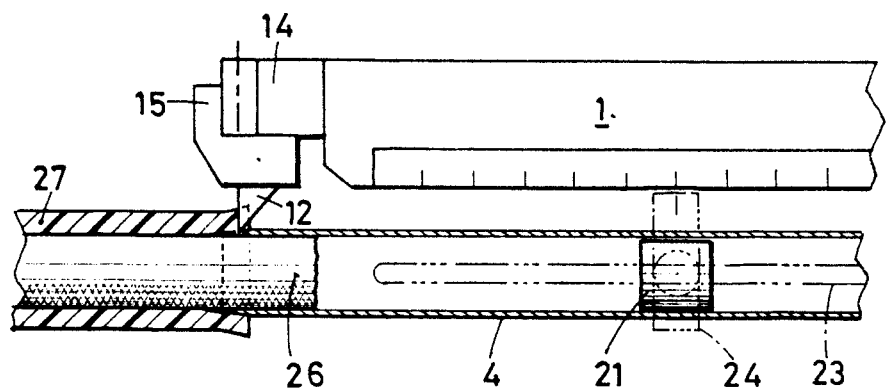
FIGS. 5, 6 and 7 represent the different stages of the utilization of the tool according to the invention for stripping a cable.

With reference to the drawings, and more particularly to FIG. 1, the cable stripping tool according to the invention comprises a support 1 of elongated shape constituted by a rigid plate, for example of metal, apertured for purposes of lightening the support. The support 1 is provided with a transverse handle 2 fixed to the support, for example by means of screws 3, the arrangement being such that the longitudinal axis of the support 1 coincides with the middle of the handle 2.

A tubular element, generally designated by the reference numeral 4, is fixed to the support 1 in such manner as to extend parallel to, and in the same direction as the support, while defining a gap 5 with the support. For this purpose, the support 1 has an enlarged portion 6, adjacent to the handle 2, having a planar surface parallel to the axis of the support 1 on which is applied an axial flat part 7 of the tubular element 4 which is clamped by means of a headed screw 8 and maintained in position, for example by two positioning dowels 9.

The tubular element 4 has such length that it extends a little beyond the end of the support 1 opposed to the handle 2, and it defines a longitudinal bore 10 which is, in the illustrated embodiment, blind at one end and open at the end opposed to the handle.

The edge of the open end of the tubular element 4 is thinned down, as shown in FIG. 3, for the reason explained hereinafter, and includes, in a position slightly set back from the end, a blind aperture 11 located between the axes of the tubular element 4 and the support 1 and in the plane defined by these axes.

A cutting blade 12 which is generally preferably roughly triangular in shape, is pivotally mounted on the end of the support 1 remote from the handle 2.

According to the illustrated embodiment, the end portion of the support 1 has a shape of a yoke (FIG. 2) and carries between its two branches 13 an arm 14, on the end of which a blade-holder head 15 is mounted to pivot about a pin 16 contained in the aforementioned plane defined by the axes of the support 1 and the tubular element 4. The blade 12 is fixed, in said plane, on the head 15 by means of a screw 17. The blade 12 has a point 19 formed by an angle between two cutting edges 18, 18'; the edge 18 is perpendicular to the axis of the tubular element 4 and the edge 18' is inclined from the tubular element 4 toward the arm 14 in the direction toward the handle 2, the point 19 being engaged in the blind aperture 11 and thereby prevented from entering the interior of the blind bore 10 of the tubular element 4.

Although in this embodiment the aperture 11 is blind, it will of course be understood that this aperture may extend throughout the thickness of the wall of the tubular element 4, provided the point 19 of the blade does not extend beyond the thickness of this wall and does not project into the interior of the bore 10.

Another embodiment of the cutting tool could be a cutter wheel or any other circular cutting element (milling cutter, grinding wheel . . .) whose part in contact with the element to be cut would be located in a cross-shaped aperture 11 satisfying the requirements of the positioning of the cutter wheel.

Advantageously, the blade-holder head 15 is capable of being angularly indexed about its pin 16 between its position in said plane and another position at 90°, as shown in FIG. 2, and may be maintained in the chosen positions by a catch element 20 in the known manner.

The stripping tool further comprises a stop member 21 slidably mounted in the bore 10 of the tubular element 4, in which the stop member may be immobilized by means of a screw 22 which extends through a lateral longitudinal slot 23 in the tubular element 4 and through a cursor 24 which is adjustable in position in front of a graduated role 25 secured to the support 1.

It will be understood that, by means of the described arrangement, the tubular element 4 may be very easily and rapidly mounted on or removed from the support 1 and, according to the invention, a series of similar tubular elements is provided which have bores of different diameters corresponding to different types of cables which may be stripped.

There will now be described, with reference to FIGS. 5 to 7, the manner of employing the stripping tool described hereinbefore.

The cable to be stripped having a sheath 27 is prevented in front of the open end of the bore 10 of the tubular element 4, which has been chosen to suit the diameter of the cable to be stripped. Preferably a few mm of the length of the sheath 27 is removed so as to facilitate the insertion of the strands of cable conductors 26 in the bore of the tubular element 4, with the thinned-down end portion of the latter inserted between the conductors 26 and the sheath 27, the stop member 21 having been previously adjusted in position (FIG. 5) and the blade 12 set in its position parallel to the axis of the tubular element 4.

Figure 6:
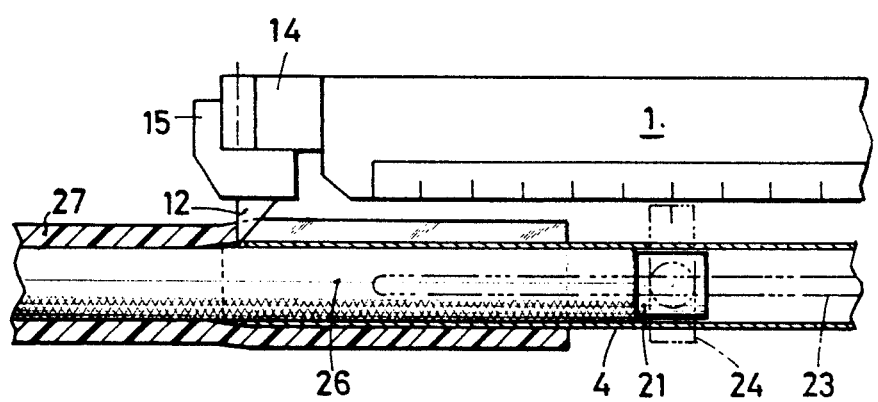
Figure 7:
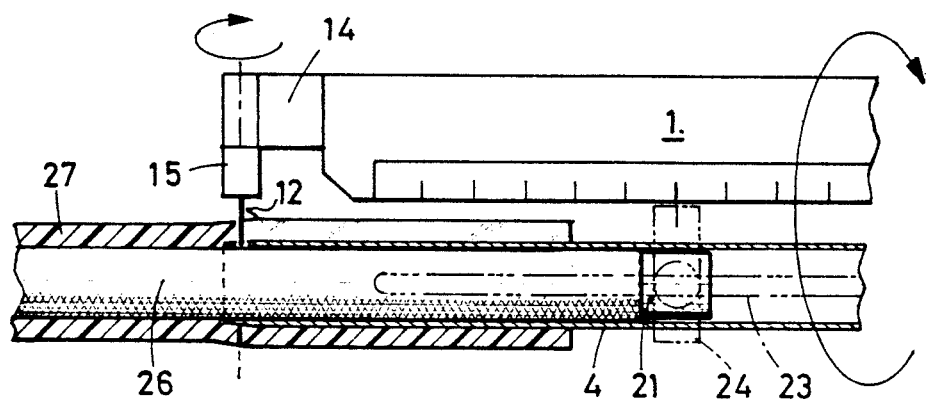

The cable is then fed axially into the bore 10 of the tubular element 4, this movement resulting in a longitudinal cut being formed in the sheath 27 by the edge 18 of the blade 12 until the end of the strands 26 has reached the stop member 21 (FIG. 6).

The blade-holder head 15 is then oriented at 90° to its initial position (FIG. 7), and the tool is then turned by means of the handle 2 while the stop member 21 is made to bear against the end of the twists of the cable 26, thereby forming an even radial cut in the sheath by the edge 18 or 18', depending on the direction in which the tool is turned. The tool is then withdrawn with the portion of the sheath 27 which remains in the tubular element 4. The cut obtained is sharp, clean and absolutely perpendicular to the axis of the cable.

Figure 8:
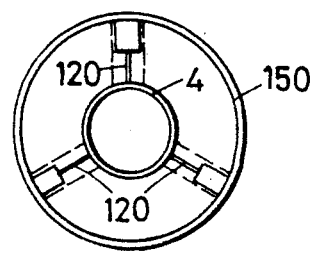
FIG. 8 is an end elevational view of a variant of the tool comprising three cutting blades.

In a variant of the tool shown in FIG. 8, the blade-holder head is formed by a sleeve 150 fixed on the end of the support 1 and surrounding the end of the tubular element 4, there being fixed inside the sleeve three blades 120 pivotally mounted on the sleeve 150 between the latter and the tubular element.

Figure 9:
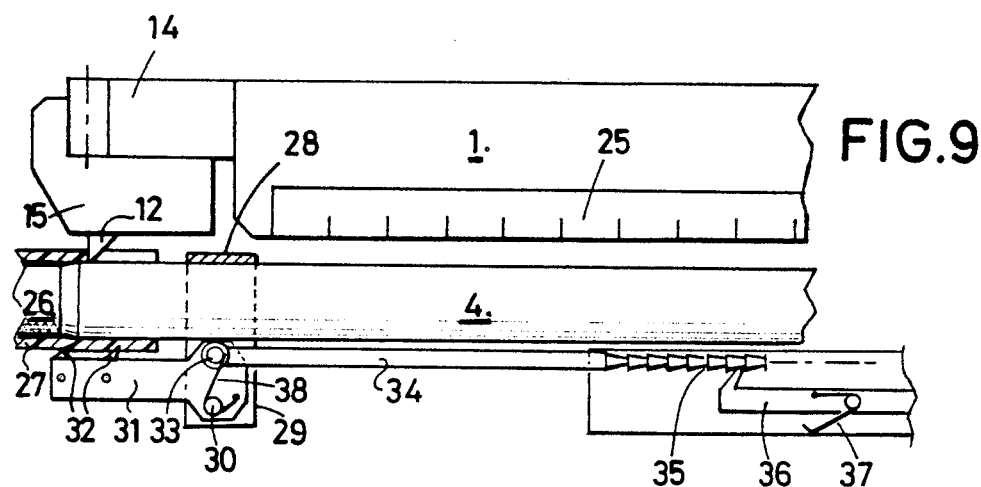
FIG. 9 is a partial view of a variant of the tool according to the invention, comprising a device for driving the cable.

With reference to FIG. 9, the illustrated variant is provided with a device for mechanically feeding the cable along the tubular element 4. This device comprises a ring 28 surrounding the tubular element 4 on which it is longitudinally slidable. The ring 28 has a radial appendage 29 carrying a fixed pin 30 on which is pivotally mounted a finger member 31 extending parallel to the tubular element 4 toward the opening of the latter, and including teeth 32 extending toward the tubular element 4. A second pin 33 is fixed on the finger member 31 between the fixed pin 30 and the tubular element 4, and there is pivotally mounted on this pin 33 an end portion of a rod 34 which extends toward the handle 2. Adjacent to the handle 2 the opposite end portion of the rod 34 carries a rack 35, which is capable of engaging a hook 36 connected to a manual actuating lever (not shown in the drawing) which may be actuated by the operator without releasing the handle 2 and which is capable of moving in translation in a direction parallel to the rod 34. A first spring 37 elastically biases the hook 36 into engagement with the rack 35; a second spring 38 also elastically biases the teeth 32 of the finger member 31 into contact with the tubular element 4.

This arrangement, well known per se, enables the cable to be mechanically drawn along in the direction toward the handle 2 by a pull exerted by the rod 34 which clamps the finger member 21 with its teeth 32 against the sheath 27 of the cable and pulls the latter in the direction toward the handle.

Figure 10:
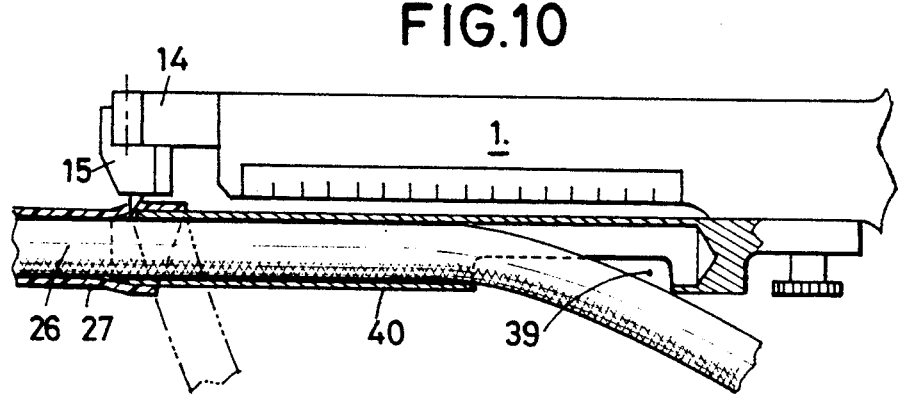
FIG. 10 is a partial view of another variant of the tool.

In the embodiment show in FIG. 10, the tubular element 40 is devoid of the stop member and cursor system and has in its rear part, i.e. that in the vicinity of its fastening to the support 1, an elongated opening 39 through which the core of the cable, constituted by the strands 26, may pass as the cable is fed or advanced longitudinally in the tubular element 40. This embodiment may be employed either with an indexing of the blade 12 in an intermediate position such as that shown in FIG. 2, which permits cutting the sheath 27 in a spiral as shown in FIG. 10, or may be employed with the variant represented in FIG. 8, in which the three blades 120 cut the sheath 27 into as many longitudinal strips which may be separated as the cable advances along the tubular element 4.

The tool according to the invention permits producing an even cut, even in the case of a constituted cable whose sheath has an uneven thickness, owing to the fact that the basic surface is the internal surface of the sheath, which is even and bears against the outer surface of the tubular element 4. Furthermore, the point of the blade 12 engaged in the cavity 11 can in no case extend beyond the inner surface of the tubular element 4 which constitutes a protective shield, so that there is no risk of damage to the subjacent conductors whose strands cannot be deformed. The electrical and mechanical qualities of the conductors are consequently safeguarded.

The features of the tool ensure a constant and reproducible quality of work and the use of the tool requires no skilled labour.

Advantageously, the tubular element is machined from a solid bar so as to define a portion having a cylindrical surface in a part of its length extending from the thinned-down opening and adapted to cooperate with the cable, and a portion having a polygonal section in the rest of its length up to the part fixed to the support 1. A tubular element is in this way obtained which is more rigid than a simple tube.

As a modification, said portion having a cylindrical surface of the tubular element 4 may be reduced to a simple tubular sector including said aperture 11, the cable being then maintained in position by gripping means, for example balls or rollers.

What is claimed is:

1. Tool for stripping a cable having at least one conductor and an outer sheath, said tool comprising a tubular element having a wall defining a bore having an opening for receiving said at least one conductor and causing said tubular element to penetrate between said at least one conductor and said outer sheath, orientable cutting means, means for feeding said cable along said tubular element, said wall of said tubular element having a first end portion and a second end portion opposed to said first end portion, an aperture provided in the thickness of the wall of said first end portion of said tubular element, a support of elongated shape, said tubular element being held in such position by said second end portion of said tubular element on said support as to extend substantially parallel to said support and in the same direction as said support from said second end portion and define a gap therebetween and the support, said cutting means closing an end of said gap adjacent to said first end portion, said cutting means being mounted on said support adjacent to said first end portion of the tubular element and engaged in said aperture without projecting into said bore of said tubular element.

2. Tool according to claim 1, wherein said first end portion of said tubular element is limited to a simple tubular sector including said aperture.

3. Tool according to claim 1, wherein said cutting means comprises an annular outer support, a plurality of blades mounted on said annular support around said first end portion of said tubular element between said tubular element and said annular support.

4. Tool according to claim 3, comprising as many of said aperture as there are blades, each of said blades defining a point constituted by an apex of an angle made by two cutting edges and extending into the respective aperture in the vicinity of said open end of said tubular element.

5. Tool according to claim 1, comprising a longitudinal slot in said tubular element, a stop member slidably mounted relative to said bore and disposed in said bore, a screw extending through said slot for immobilizing the stop member in said bore, and a cursor carried by said screw.

6. Tool according to claim 5, comprising a graduated rule secured to said support, said cursor being movable in confronting relation to said graduated rule.

7. Tool according to claim 1, wherein said means for feeding said cable comprise a finger member, first pivot means pivotally mounting the finger member relative to said tubular element, a rack movable relative to said tubular element, a manual lever associated with said rack for moving said rack relative to said tubular element, and second pivot means pivotally connecting the finger member to said rack.

8. Tool according to claim 1, wherein said support has a longitudinal axis and said tool further comprises a handle mounted on said support on said longitudinal axis and extending transversely of said longitudinal axis.

9. Tool according to claim 1, wherein said tubular element comprises a lateral throughway opening adjacent to said second end portion of the tubular element for passage of said at least one conductor out of said bore.

10. Tool according to claim 1, wherein said wall of said first end portion of said tubular element is thinned down so as to facilitate the penetration of said first end portion between said sheath and said at least one conductor of said cable.

11. Tool according to claim 1, wherein said aperture is a blind aperture in said wall of said tubular element.

12. Tool according to claim 2, wherein said aperture is a blind aperture in said wall of said tubular element.

13. Tool according to claim 1, wherein said cutting means comprises circular cutter members.

* * * * *